Patented May 19, 1942

2,283,198

UNITED STATES PATENT OFFICE 2,283,198

BROMINE PROCESS FOR GOLD ORES

Colin G. Fink and Garth Louis Putnam,
New York, N. Y.

No Drawing. Application November 1, 1940,
Serial No. 363,896

3 Claims. (Cl. 75—102)

The present invention relates to the recovery of gold from its ores by leaching with solvents containing free bromine and a soluble chloride or bromide. A purpose of the invention is to increase the dissolution velocity of gold minerals in aqueous bromine solutions.

It should be noted that bromine solvents, unlike solutions of chlorine, retain their power to dissolve gold even in the presence of calcium carbonate and can therefore be used with ores containing calcite. Another difference in the behavior of the two halogens is that bromine solutions are not suitable for ores containing large amounts of silver, silver bromide being more insoluble than silver chloride. These facts, as well as the fact that alkaline substances are deleterious to bromine solvents and the fact that bromine solvents should be acid, i. e., have a pH less than 7, are well known.

The basis of our invention is our discovery that chloride and bromide ions accelerate the dissolving of pure gold in aqueous bromine solutions. Moreover, chlorine or hypochlorites may be used as intermediate oxidizing agents as indicated by the equations:

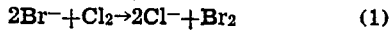
$$2Br^- + Cl_2 \rightarrow 2Cl^- + Br_2 \qquad (1)$$

or

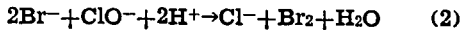
$$2Br^- + ClO^- + 2H^+ \rightarrow Cl^- + Br_2 + H_2O \qquad (2)$$

The free bromine is converted to bromide ion by reaction with native gold as well as by other reactions which take place during the metallurgical process.

After leaching the gold out of the ore with the solvent which contains free bromine, the precious metal is precipitated by any of the well-known methods, such as by addition of zinc dust or ferrous sulfate. The reactions which result in the elimination of the gold also cause reduction of the free bromine to bromide ion. The solvent power of the barren solution may then be restored by addition of chlorine or of hypochlorite and a mineral acid, as indicated by Equations 1 and 2 above. Except for losses due to vaporization and solution left in the tailings, practically all of the free and combined bromine is recovered.

In order to demonstrate the effect of chloride ion on the dissolving of gold in bromine solutions, reagents which contained 1.0 gram of sodium bromide per liter, 0.10 gram of free chlorine per liter, and varying amounts of sodium chloride were prepared. Rapid reaction took place between the chlorine and sodium bromide, as shown by the instantaneous development of a yellow color. Table I gives the results obtained when the solvents were shaken at a temperature of 24° C. and at a constant rate with 23-carat gold leaf, the latter material containing copper as the principal impurity and less than 0.5 per cent of silver.

TABLE I.—*Time required for sodium chloride-bromine solvents to dissolve 23-carat gold leaf*

| Concentration of sodium chloride in grams per liter | Time required for the solvent to dissolve gold leaf |
|---|---|
| | *Minutes* |
| 0.0 | 25 |
| 25.0 | 11 |
| 50.0 | 9 |
| 100.0 | 4.1 |
| 200.0 | 3.3 |

Table I shows that sodium chloride accelerates the dissolving of gold in bromine water.

Other experiments have proven that the addition of chlorides to bromine water accelerates the dissolution of 99.9 per cent pure gold foil. We have confirmed these results by tests with gold-silver alloys and with ore samples. Moreover, chlorine solutions in sea water are effective solvents for gold, even in the presence of calcium carbonate, and we attribute this to the presence of chlorides and bromides in the sea water.

An example which indicates one method by which our invention may be applied is:

To one part of a roasted concentrate assaying 0.710 oz. of gold per ton was added two parts by weight of a solution prepared by dissolving in water 100 grams of sodium chloride per liter, 1.0 gram of sodium bromide per liter, and 1.4 grams of chlorine per liter. During the first 15 minutes of contact of the solution with the ore, an amount of sulfuric acid corresponding to 1.25 grams per liter of solution was slowly added. After standing for 10 minutes the ore residue was filtered, washed, dried, and assayed. As the tailings assayed only 0.077 oz. of gold per ton, it was calculated that 89.1 per cent of the gold had been extracted.

Having described our invention, what we claim is:

1. The process of extracting gold from its ores which comprises the step of leaching the ore with a solvent prepared by adding free chlorine to a solution containing a bromide and a large excess of a chloride salt.

2. The process of extracting gold from its ores which comprises the step of leaching the ore with a solvent prepared by adding a hypochlorite and a mineral acid to a solution containing a bromide and a large excess of chloride salt.

3. The process of extracting gold from its ores which comprises the step of leaching the ore with a solvent consisting essentially of bromine and a large excess of chloride salt.

COLIN G. FINK,
GARTH LOUIS PUTNAM.